United States Patent
Yokoyama et al.

(10) Patent No.: US 8,910,617 B2
(45) Date of Patent: Dec. 16, 2014

(54) CONTROL DEVICE FOR INTERNAL COMBUSTION ENGINE

(75) Inventors: Yuu Yokoyama, Okazaki (JP); Masaki Numakura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 454 days.

(21) Appl. No.: 13/255,180

(22) PCT Filed: Oct. 26, 2009

(86) PCT No.: PCT/JP2009/068348
§ 371 (c)(1),
(2), (4) Date: Sep. 7, 2011

(87) PCT Pub. No.: WO2011/052028
PCT Pub. Date: May 5, 2011

(65) Prior Publication Data
US 2013/0025568 A1    Jan. 31, 2013

(51) Int. Cl.
| | | |
|---|---|---|
| F02D 13/02 | (2006.01) | |
| F02D 41/06 | (2006.01) | |
| F02D 41/34 | (2006.01) | |
| F01L 1/344 | (2006.01) | |
| F02D 41/36 | (2006.01) | |
| F02D 41/00 | (2006.01) | |

(52) U.S. Cl.
CPC ............ *F02D 13/0238* (2013.01); *F02D 13/02* (2013.01); *F01L 1/3442* (2013.01); *F02D 41/062* (2013.01); *F02D 41/36* (2013.01);
(Continued)

(58) Field of Classification Search
CPC ......... F02D 13/02; F02D 41/06; F02D 41/34; F02D 13/0238; F02D 41/36; F02D 41/062; F02D 2013/0292; F02D 2041/001; F02D 2200/021; F02D 2200/023; F01L 1/3442; F01L 2001/34469; F01L 2800/01; F01L 2800/03; F01L 2800/05; Y02T 10/18
USPC .............. 123/445, 90.15, 90.16, 90.17, 90.19
See application file for complete search history.

(56) References Cited

U.S. PATENT DOCUMENTS 6,640,758 B2 * 11/2003 Ashida ........................ 123/90.15
7,159,545 B2 *  1/2007 Miyakoshi et al. ......... 123/90.15
(Continued)

FOREIGN PATENT DOCUMENTS

| JP | A-8-326584 | 12/1996 |
|---|---|---|
| JP | A-2000-154749 | 6/2000 |

(Continued)

OTHER PUBLICATIONS

Feb. 21, 2012 Notice of Allowance issued in Japanese Patent Application No. 2011-510603 (with translation).

(Continued)

*Primary Examiner* — Hai Huynh
*Assistant Examiner* — Raza Najmuddin
(74) *Attorney, Agent, or Firm* — Oliff PLC

(57) ABSTRACT

If a relative rotational phase between a first rotor drivably connected to a crankshaft and a second rotor drivably connected to a camshaft is not an intermediate lock phase when an engine is started, a fuel injection starting timing is delayed more than that of the time when the relative rotational phase is the intermediate lock phase. The delay time is determined according to the working oil temperature of a valve timing mechanism during the engine start or the same oil temperature at the previous stop time of the engine, for example. As a result, the start of the engine can be completed as soon as possible while retaining the startability of the internal combustion engine.

12 Claims, 12 Drawing Sheets

(52) U.S. Cl.
CPC .................................................................
F02D 41/06 (2013.01); F01L 2001/34469 (2013.01); F01L 2800/01 (2013.01); F01L 2800/03 (2013.01); F01L 2800/05 (2013.01); F02D 2013/0292 (2013.01); F02D 2041/001 (2013.01); F02D 2200/0241 (2013.01); F02D 2200/023 (2013.01); Y02T 10/18 (2013.01)
USPC ................ 123/445; 123/90.15; 123/90.16; 123/90.17; 123/90.19

(56) References Cited

U.S. PATENT DOCUMENTS

| | | | | |
|---|---|---|---|---|
| 8,215,272 | B2 * | 7/2012 | Takemura et al. | 123/90.15 |
| 8,245,675 | B2 * | 8/2012 | Tomimatsu et al. | 123/90.15 |
| 2002/0139333 | A1 * | 10/2002 | Kusano et al. | 123/90.17 |

FOREIGN PATENT DOCUMENTS

| | | |
|---|---|---|
| JP | A-2000-154753 | 6/2000 |
| JP | A-2001-41012 | 2/2001 |
| JP | A-2002-309975 | 10/2002 |
| JP | A-2003-129806 | 5/2003 |
| JP | A-2004-52613 | 2/2004 |
| JP | A-2004-308632 | 11/2004 |

OTHER PUBLICATIONS

International Search Report issued in International Application No. PCT/JP2009/068348 on Nov. 24, 2009 (with translation).

* cited by examiner

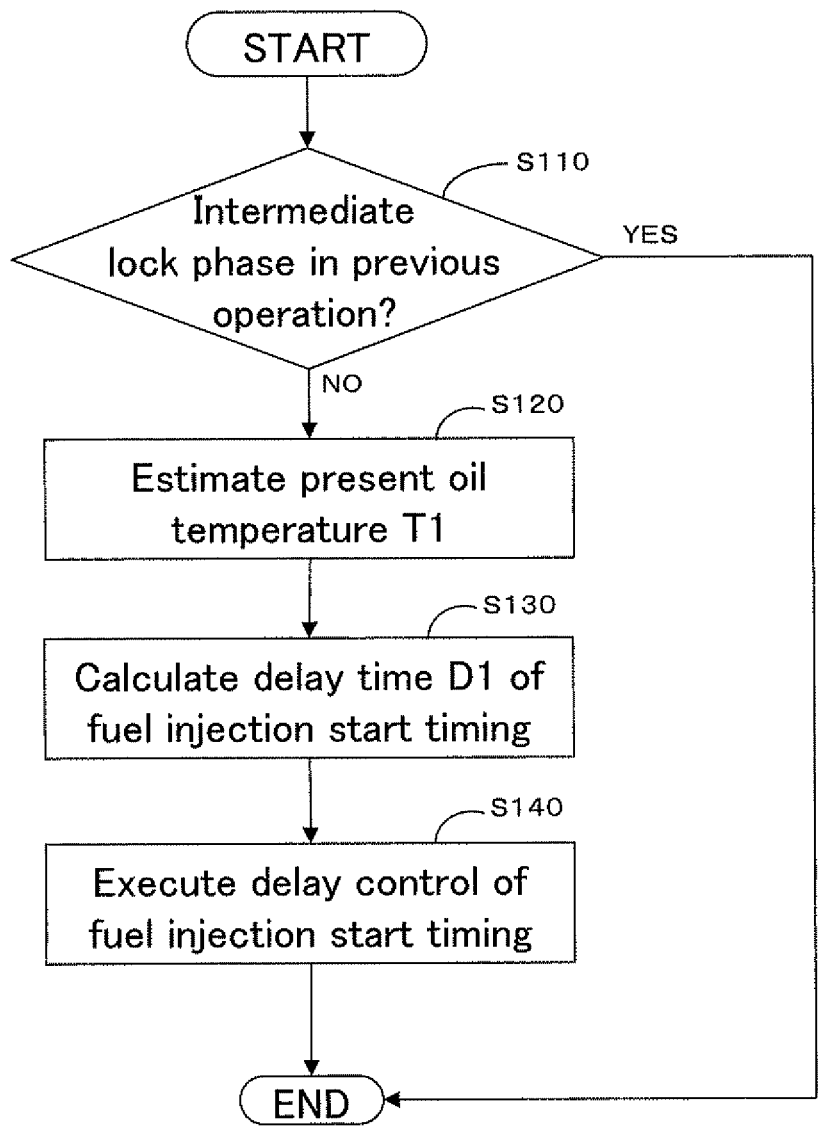

CONTROL DEVICE FOR INTERNAL COMBUSTION ENGINE

TECHNICAL FIELD

The present invention relates to a controller for an internal combustion engine

BACKGROUND ART

It is known that a fuel injection device (hereinafter referred to as an injector) and spark plugs are arranged in an intake passage and combustion chambers of an internal combustion engine.

Further, a variable valve timing device has been put into practical use which varies the valve timing of engine valves such as intake valves or exhaust valves by enabling the rotational phase of a camshaft to be varied relative to a crankshaft. The variable valve timing device includes a variable valve timing mechanism having a first rotational body, which is drive-coupled to the crankshaft, and a second rotational body, which is drive-coupled to the camshaft. In this structure, the first rotational body and second rotational body are rotated relative to each other by hydraulic pressure or the like. This varies the rotational phase of the camshaft relative to the crankshaft changes thereby varying the valve timing.

Another known variable valve timing device includes an "intermediate lock mechanism" that fixes the valve timing to a range between the most retarded phase and the most advanced phase, which is the variable range of the relative rotational phase, at a phase excluding the two ends of the range (hereinafter referred to as intermediate lock phase).

Patent Document 1 discloses a control that sets the relative rotational phase of the variable valve timing mechanism to the intermediate lock phase when starting the engine. If the relative rotational phase is not at the intermediate lock phase when starting the engine, the variable valve timing mechanism is controlled so that the phase is set to the intermediate lock phase.

In this state, even when fuel injection is performed before the phase is varied to the intermediate lock phase, the fuel may not be ignited. Collection of fuel on the spark plug may lower the ignition capability of the spark plug and adversely affect startability of the engine.

Accordingly, in patent document 1, the fuel injection is controlled so that it does not start until the relative rotational phase of the variable valve timing mechanism is determined as having reached the intermediate lock phase. The determination is made by monitoring whether or not the valve timing is fixed at the intermediate lock phase.

PRIOR ART DOCUMENT

Patent Document

Patent Document 1: Japanese Patent Laid-Open Publication No. 2001-41012

SUMMARY OF THE INVENTION

Problems to be Solved by the Invention

The monitoring of the valve timing monitoring described above is performed by calculating the present relative rotational phase of the variable valve timing mechanism from a crank angle, which is detected by a crank position sensor, and a cam angle, which is detected by a cam position sensor.

As the crank position sensor and cam position sensor, an electromagnetic pick up type sensor, for example, is used.

As an example of a method for detecting crank angle using an electromagnetic pick up type sensor, one method arranges projecting teeth on the circumference of a timing rotor, which is coupled to the crankshaft, and detects the teeth of the rotating timing rotor.

In this structure, the detection accuracies of the crank position sensor and the cam position sensor cannot be kept normal unless the rotational speeds of the crank position sensor and the cam position sensor are greater than or equal to predetermined values. That is, the crank angle and the cam angle cannot be detected normally by the crank position sensor and the cam position sensor unless the rotational speeds of the crank position sensor and the cam position sensor are greater than or equal to the predetermined values.

When starting the internal combustion engine, for example, during cranking, the rotational speeds of the crankshaft and the camshaft are low. Thus, when starting the internal combustion engine, the relative rotational phase of the variable valve timing mechanism may not be detected depending on the crank position sensor and the cam position sensor. Accordingly, during the staring of the engine, when varying the relative rotational phase to the intermediate lock phase, the detection of whether or not the phase has been varied to the intermediate lock phase may not be possible. As a result, when the starting timing of the fuel injection is retarded to until when determined that the phase has been varied to the intermediate lock phase, the determination is not made normally. Thus, fuel injection is not started normally, and the startability of the engine may be deteriorated.

Accordingly, it is an object of the present invention to provide a controller for an internal combustion engine that ensures the startability of the engine when the valve timing is not at an intermediate lock phase during the starting of the engine.

To achieve the above object, a controller for an internal combustion engine according to the present invention is provided. The internal combustion engine includes a fuel injection device that injects fuel into the internal combustion engine, a crankshaft, a camshaft that opens and closes an engine valve of the internal combustion engine, and a variable valve timing device that varies a valve timing of the engine valve. The variable valve timing device includes a variable valve timing mechanism, an intermediate lock mechanism, a relative rotational phase detection unit, and a phase varying unit. The variable valve timing mechanism includes a first rotational body, which is drive-coupled to the crankshaft, and a second rotational body, which is drive-coupled to the camshaft. The variable valve timing mechanism varies a relative rotational phase of the first rotational body and the second rotational body by controlling hydraulic pressure to vary the valve timing. The intermediate lock mechanism fixes the relative rotational phase to an intermediate lock phase, which is a phase in a variable range of the relative rotational phase excluding both ends of the variable range and which allows the engine to start. The relative rotational phase detection unit detects the relative rotational phase. The relative rotational phase detection unit includes a cam angle sensor, which is capable of detecting a rotational angle of the camshaft when a rotational speed of the camshaft is greater than or equal to a predetermined value, and a crank angle sensor, which is capable of detecting a rotational angle of the crankshaft when rotational speed of the crankshaft is greater than or equal to a predetermined value. The relative rotational phase detection unit calculates the relative rotational phase based on the rotational angle of the camshaft detected by the cam angle sensor and the rotational angle of the crankshaft detected by the crank angle sensor. The phase varying unit varies the relative rotational phase to the intermediate lock phase so that the relative rotational phase becomes the intermediate lock phase when starting the internal combustion engine. The controller of the internal combustion engine delays a fuel injection start timing of the fuel injection device.

In the above structure, during starting of the internal combustion engine, the fuel injection device is controlled to delay the fuel injection start timing.

Thus, during the starting of the engine, when the phase varying unit varies the relative rotational phase to the intermediate lock phase, for example, the fuel amount injected from when cranking starts to when the varying ends, is decreased as compared to when fuel is injected from when cranking starts. This prevents a spark plug from becoming wet due to the fuel injected until the relative rotational phase is varied to the intermediate lock phase at which the engine can be started. Thus, the ignition capability of the spark plug is prevented from being lowered. This ensures startability of the engine.

In one aspect of the present invention, when the relative rotational phase is not the intermediate lock phase during the starting of the internal combustion engine, the controller delays the fuel injection start timing of the fuel injection device compared to when the relative rotational phase is located at the intermediate lock phase.

In the above structure, during the starting of the engine, when the relative rotational phase of the first rotational body and the second rotational body, that is, the relative rotational phase of the variable valve timing mechanism, is not at the intermediate lock phase, the fuel injection device is controlled so that the timing at which fuel injection starts is delayed as compared to when the relative rotational phase is as the intermediate lock position.

Thus, during the starting of the engine, the fuel amount injected until the phase varying unit varies the relative rotational phase to the intermediate lock phase is decreased as compared to when the timing at which the fuel injection starts is not delayed. This prevents a spark plug from becoming wet due to the fuel injected until the relative rotational phase is varied to the intermediate lock phase at which the engine can be started. Thus, the ignition capability of the spark plug is prevented from being lowered. This ensures startability of the engine.

In one aspect of the present invention, based on the relative rotational phase during a previous operation of the internal combustion engine, the relative rotational phase is determined as not being at the intermediate lock phase during the present starting of the internal combustion engine.

To detect relative rotation with the relative rotational phase detection unit, the crankshaft and the camshaft must be rotated at predetermined speeds or greater. During the starting of the engine, for example, during cranking, the rotational speeds are low. Thus, the relative rotational phase may not be detected.

In the above structure, during the rotation, for example, the relative rotational phase of the variable valve timing mechanism is determined as not being at the intermediate lock phase during the present engine starting from the relative rotational phase of the variable valve timing mechanism of the previous engine operation, for example, when the engine was previously stopped. Accordingly, when the engine is presently being started, unless the relative rotational phase is not at the intermediate lock phase, the fuel injection by the fuel injection device may be delayed. This ensures the startability of the engine.

In one aspect of the present invention, the controller delays the fuel injection start timing in accordance with an oil temperature of the variable valve timing device during the starting of the internal combustion engine.

In one aspect of the present invention, the controller delays the fuel injection start timing when oil temperature of the variable valve timing device during the starting of the internal combustion engine is low as compared to when the oil temperature is high.

When performing hydraulic pressure control with the variable valve timing mechanism, oil is present in the variable valve timing mechanism. The oil produces resistance against the relative rotational of the first rotational body and second rotational body produced by the phase varying unit. Thus, the time required for the valve timing to vary to the intermediate lock phase when the engine is starting changes in accordance with the state of the oil in the variable valve timing mechanism. Specifically, the time changes in accordance with the viscosity and amount of the oil.

The viscosity of oil is correlated with the oil temperature. Thus, when the phase varying unit varies the phases of the first rotational body and second rotational body to the intermediate lock phase, the time required vary the phase changes in accordance with the oil temperature. Thus, the timing for starting fuel injection is delayed in accordance with the oil temperature when starting the engine to shorten the time until fuel injection starts. This ensures the startability of the engine and starts fuel injection as soon as possible to end the starting of the engine.

Generally, when the oil temperature is low, the viscosity is higher as compared to when the temperature is high. Thus, the time required for the phase varying unit to vary the relative rotational phase of the first rotational body and the second rotational body to the intermediate lock phase is prolonged when the oil temperature is low as compared when it is high. Accordingly, when the oil temperature is low, the fuel injection start timing is delayed as compared to when the oil temperature is high. This ensures the startability of the engine and starts fuel injection as soon as possible to end the starting of the engine.

In one aspect of the present invention, the controller delays the fuel injection start timing in accordance with oil temperature of the variable valve timing device during a previous operation of the internal combustion engine.

In one aspect of the present invention, the controller delays the fuel injection start timing when oil temperature of the variable valve timing device during a previous operation of the internal combustion engine is low as compared to when the oil temperature is high.

The oil remaining in the variable valve timing mechanism produces resistance against the relative rotational of the first rotational body and second rotational body by the phase varying unit. The oil remaining in the variable valve timing mechanism during operation of the engine flows out and decreases when the engine stops. In this state, the flow amount of the oil is generally small when the viscosity of the oil is high and large when the viscosity of the oil is low. Thus, the amount of oil in the variable valve timing mechanism during the starting of the engine changes in accordance with the viscosity of the oil during the previous engine operation.

Accordingly, since the viscosity of the oil is correlated with the oil temperature, the timing for starting fuel injection is delayed in accordance with the oil temperature during the previous engine operation. This shortens the time until the fuel injection starts and ensures the startability of the engine, and starts fuel injection as soon as possible to end the starting of the engine.

Generally, when the oil temperature is low, the viscosity is higher as compared to when the temperature is high. Thus, the time required for the phase varying unit to vary the phase is prolonged when the oil temperature during the previous stopping of the engine is low as compared when it is high because a large amount of oil remains in the variable valve timing mechanism when the engine is started the next time. Accordingly, when the oil temperature is low, the fuel injection start timing is delayed as compared to when the oil temperature is high. This ensures startability of the engine and starts fuel injection as soon as possible to end the starting of the engine.

In one aspect of the present invention, the oil temperature is estimated based on a parameter correlated with the oil temperature.

The oil temperature is calculated based on, for example, a coolant temperature sensor or an intake air temperature. Accordingly, the above structure eliminates the need for adding a new component, such as an oil temperature sensor. This prevents the number of components from increasing.

In one aspect of the present invention, the controller delays the fuel injection start timing in accordance with a coolant temperature of the internal combustion engine.

In one aspect of the present invention, the controller delays the fuel injection start timing when a coolant temperature of the internal combustion engine is low as compared to when the coolant temperature is high.

Generally, the coolant temperature is correlated with the oil temperature. Further, the oil temperature is correlated with the viscosity of the oil temperature. Further, as described above, the viscosity changes the time required for the variable valve timing mechanism to vary the phase to the intermediate lock phase. Thus, by delaying the timing for starting fuel injection in accordance with the coolant temperature, the time until the fuel injection starts is shortened. This ensures the startability of the engine and starts fuel injection as soon as possible to end the starting of the engine.

Further, generally, when the coolant temperature is high, the oil temperature is high as compared to when the temperature is low. Thus, when the coolant temperature is low during the starting of the internal combustion engine, the timing for starting fuel injection is delayed compared to when the coolant temperature is high. This ensures startability of the engine and starts fuel injection as soon as possible to end the starting of the engine.

In one aspect of the present invention, the controller delays the fuel injection start timing when the relative rotational phase during a previous operation of the internal combustion engine is far from the intermediate lock phase as compared to when the relative rotational phase is close to the intermediate lock phase.

When the phase varying unit varies the relative rotational phase of the first rotational body and the second rotational body to the intermediate lock phase, more time is required when the relative rotational phase is far from the intermediate lock phase than when it is close. Thus, the above structure ensures the startability of the engine and starts fuel injection as soon as possible to end the starting of the engine.

BRIEF DESCRIPTION OF THE DRAWINGS

FIG. 3(a) is a cross-sectional view taken when a relative rotational phase of a vane rotor is at a most retarded phase, FIG. 3(b) is a cross-sectional view taken when the relative rotational phase of the vane rotor is in the vicinity of an intermediate lock phase, and FIG. 3(c) is a cross-sectional view taken when the relative rotational phase of the vane rotor is at the intermediate lock phase;

FIG. 4 is a flowchart showing fuel injection start timing control procedures according to the first embodiment;

DETAILED DESCRIPTION OF THE PREFERRED EMBODIMENTS

First Embodiment

An internal combustion engine controller according to a first embodiment of the present invention will now be described with reference to FIGS. 1 to 6.

Figure 1:
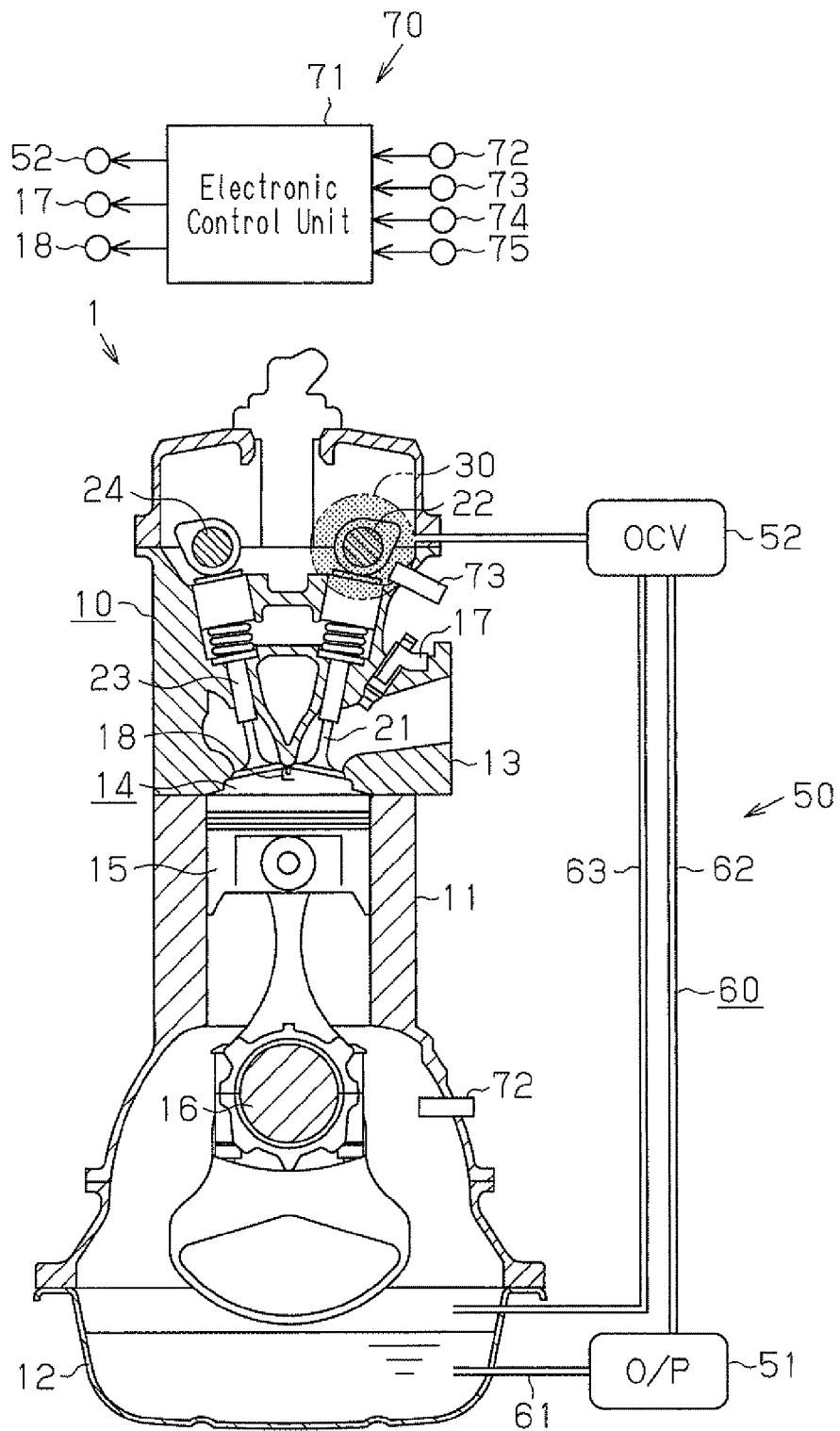
FIG. 1 is a diagram showing the overall structure of an internal combustion engine including a controller according to a first embodiment of the present invention.

As shown in FIG. 1, an intake manifold arranged in a cylinder head 13 of an internal combustion engine 1 includes an injector 17, which injects fuel into the intake manifold. Further, an electronic control unit 71 is connected to the injector 17. The injector 17 functions as a fuel injection device.

The electronic control unit 71 receives various types of information detected by a crank position sensor 72, a cam position sensor 73, an intake-air temperature sensor 74, and a coolant temperature sensor 75. Based on the information, the electronic control unit 71 sends a command to the injector 17 in relation with the appropriate fuel injection amount. The electronic control unit 71 functions as a controller for the internal combustion engine.

An intake camshaft 22, which is arranged on the cylinder head 13, includes a hydraulic pressure type variable valve timing mechanism 30, which varies the valve timing of intake valves 21. A hydraulic mechanism 50, which drives the variable valve timing mechanism 30, includes an oil control valve 52 (hereinafter abbreviated as the OCV). The OCV 52 is connected to the electronic control unit 71.

A relative rotational phase, namely, the valve timing, of the variable valve timing mechanism 30 when the engine is operating is calculated when the crank angle and intake cam angle detected by the crank position sensor 72 and the cam position sensor 73 are input to the electronic control unit 71 and processed. The crank position sensor 72, cam position sensor 73, and electronic control unit 71 form a relative rotational phase detection unit.

The crank position sensor 72 is an electromagnetic pick up type sensor. The functions of the crank position sensor 72 will now be described. Projecting teeth are arranged on the circumference of a timing rotor (not shown), which is coupled to the crankshaft 16. The crank position sensor 72 lies along the same plane as the timing rotor and is directed toward the center of the rotor. When the rotor rotates, the teeth arranged on the circumference of the rotor changes the distance between the crank position sensor 72 and the rotor. The crank position sensor 72 monitors the electromotive force generated by the change in a coil of the crank position sensor 72 to detect rotational of the crankshaft 16. Further, the teeth on the rotor are not evenly arranged on the entire circumference. The rotational angle of the crankshaft 16 is detected by monitoring such an uneven portion. The cam position sensor 73 also functions in the same manner.

Here, the crank position sensor 72 can detect the crank angle when the rotational speed of the crankshaft 16 is greater than or equal to a predetermined value. In the same manner, the cam position sensor 73 can detect the intake cam angle when the rotational speed of the intake camshaft 22 is greater than or equal to a predetermined value. The predetermined values are determined in accordance with the detection accuracies of the crank position sensor 72 and the cam position sensor 73.

During the operation of the engine, for example, when the present valve timing detected by the relative rotational phase detection unit differs from a target valve timing, a state of the OCV 52 is changed by a command output from the electronic control unit 71. This change controls the oil supplied to and discharged from the variable valve timing mechanism 30. This varies the valve timing of the intake valves 21 to the target valve timing.

Figure 2:
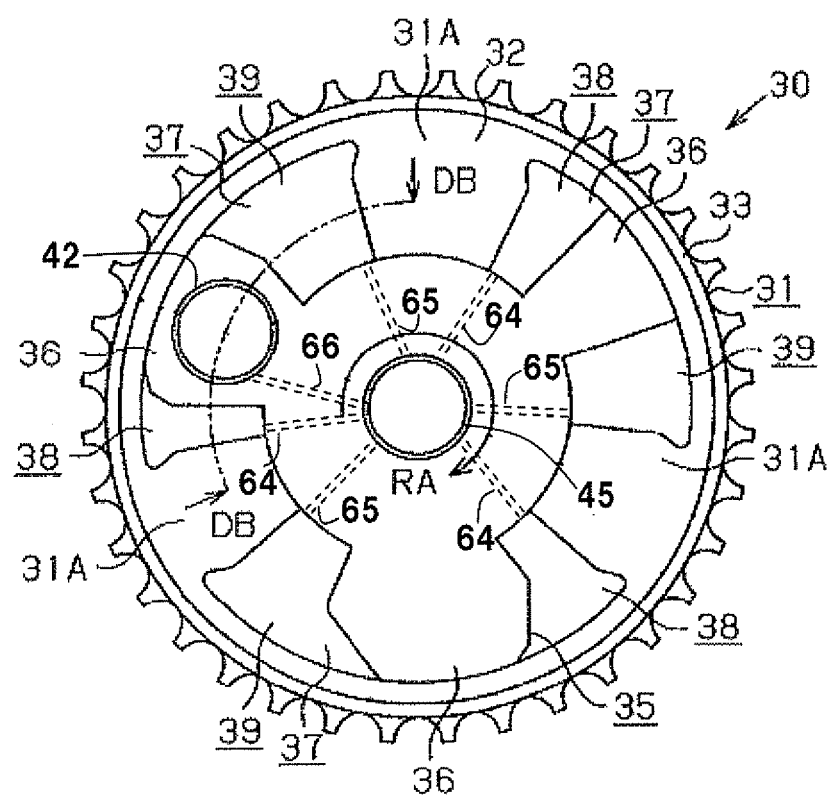
FIG. 2 is a diagram showing a variable valve timing mechanism of FIG. 1.
Figure 3A:
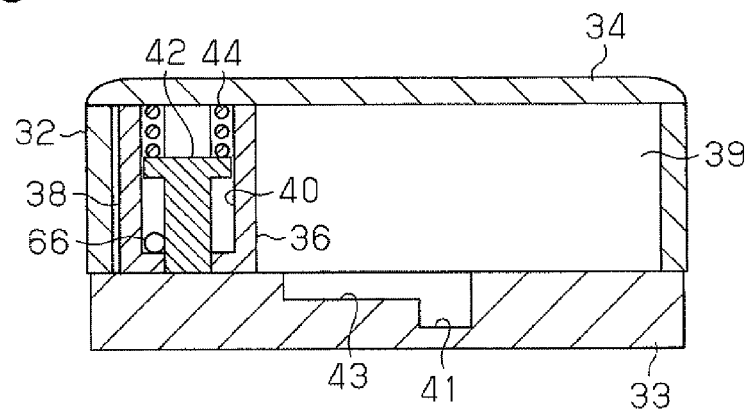
FIGS. 3(a) to 3(c) are cross-sectional views taken along line DB-DB in FIG. 2, where

Next, the variable valve timing device will now be described with reference to FIGS. 2 and 3. FIG. 2 is a plan view showing the structure of the variable valve timing mechanism 30 in a state in which a cover 34 shown in FIG. 3(a) is removed from a housing body 32. Further, in FIG. 2, the arrow RA indicates a rotational direction (hereinafter referred to as the rotational direction RA) of the camshaft 22 and a sprocket 33.

As shown in FIG. 2, the variable valve timing mechanism 30 includes a housing rotor 31, which is rotated in synchronism with the crankshaft 16, and a vane rotor 35, which is fixed by a bolt 45 to an end of the intake camshaft 22 and rotated in synchronism with the intake camshaft 22.

The housing rotor 31 includes the sprocket 33, which is coupled by a timing chain (not shown) to the crankshaft 16 and rotated in synchronism with the crankshaft 16, the housing body 32, which is coupled to the inner side of the sprocket 33 and rotated integrally with the sprocket 33, and the cover 34, which is attached to the body 32.

The vane rotor 35 is arranged in the housing body 32 and accommodated in a void formed by this body 32 and the cover 34. The housing body 32 includes three partition walls 31A, which project toward the vane rotor 35 in the radial direction. The vane rotor 35 includes three vanes 36 that project toward the housing body 32 in three vane accommodation chambers 37, each defined between the partition walls 31A. Each vane rotor 35 defines an advancing chamber 38 and a retarding chamber 39 in the corresponding vane accommodation chamber 37.

Each advancing chamber 38 is located rearward from the vane 36 in the rotational direction RA of the intake camshaft 22 in the corresponding vane accommodation chamber 37. The hydraulic mechanism 50 changes the volume of the advancing chamber 38 in accordance with the supplying and discharging state of oil in the variable valve timing mechanism 30. Each retarding chamber 39 is located frontward in the rotational direction RA of the intake camshaft 22 and, in the same manner, changes its volume in accordance with the supplying and discharging state of oil.

Specifically, the volume of the advancing chamber 38 increases when oil is supplied from an oil passage, which is formed near the bolt 45, to the advancing chamber 38 through an advancing oil passage 64. This rotates the vane rotor 35 toward the advancing side. The volume of the retarding chamber 39 increases when oil is supplied from the oil passage, which is formed near the bolt 45, to the retarding chamber 39 through a retarding oil passage 65. This rotates the vane rotor 35 toward the retarding side. Further, the oil can be discharged from the advancing chamber 38 and the retarding chamber 39 through the advancing oil passage 64 and the retarding oil passage 65. In this manner, the OCV 52 between switches between the supplying and discharging of oil through the advancing oil passage 64 and the retarding oil passage 65. That is, an oil supply passage 62 is connected to the advancing oil passage 64 or the retarding oil passage 65 to supply oil is to the oil passage 64 or 65. Further, an oil discharge passage 63 is connected to the advancing oil passage 64 or the retarding oil passage 65 to discharge oil from the oil passage 64 or 65.

The variable valve timing mechanism 30 varies the rotational phase of the vane rotor 35 relative to the housing rotor 31 with the structure described above. This varies the valve timing.

When the vane rotor 35 is rotated relative to the housing rotor 31 toward the advancing side to a control limit, that is, when the rotational phase of the vane rotor 35 is at the most forward phase in the rotational direction RA (hereinafter referred to as the "most advanced phase"), the valve timing is set to the most advanced timing. On the other hand, when the vane rotor 35 is rotated toward the retarding side to a control limit, that is, when the rotational phase of the vane rotor 35 is at the most rearward phase in the rotational direction RA (hereinafter referred to as the "most retarded phase"), the valve timing is set to the most retarded timing.

The variable valve timing device includes an "intermediate lock mechanism" that fixes the valve timing by locking the relative rotational between the housing rotor 31 and the vane rotor 35 at an intermediate lock phase between the most retarded phase and the most advanced phase, excluding the two ends. As the intermediate lock phase, for example, a phase corresponding to a valve timing at which the engine can be started is set.

The intermediate lock mechanism is operated based on the supply of oil from the hydraulic mechanism 50 to fix the valve timing to an intermediate lock phase by locking the housing rotor 31 and the vane rotor 35 to each other when the rotational phase of the vane rotor 35 relative to the housing rotor 31 is at an intermediate lock phase and an intermediate lock request is issued.

Specifically, as shown in FIG. 3(a), the intermediate lock mechanism includes a lock pin 42, which is arranged in a vane 36 and is movable relative to the vane 36, a lock pin accommodation chamber 40, which is also arranged in the vane 36 and discharges and receives oil to and from a pin oil passage 66, a biasing spring 44, which is also arranged in the vane 36 to force the lock pin 42 in one direction, and a lock hole 41, which is arranged in the housing rotor 31.

The lock pin 42 moves in a direction in which it projects from the vane 36 (hereinafter referred to as the projection direction) and another direction in which it is retracted into the vane 36 (hereinafter referred to as the accommodation direction) based on the relationship between the force of the oil in the lock pin accommodation chamber 40 and the force of the biasing spring 44. The hydraulic pressure of the lock pin accommodation chamber 40 is applied to the lock pin 42 in the accommodation direction. The force of the biasing spring 44 acts on the lock pin 42 in the projection direction. When the lock pin 42 projects into the lock hole 41 and engages with the hole 41, the housing rotor 31 and the vane rotor 35 are locked to each other at the intermediate lock phase.

The intermediate lock request is issued when, for example, the engine is idling. Normally, the engine idles before stopping operation. Thus, by locking the variable valve timing mechanism 30 at the intermediate lock phase when the engine is idling, the valve timing would be fixed to the intermediate lock phase the next time the engine is started.

When the engine stops without shifting to an idle state due to engine stalling or the like, the engine may have been stopped in a state in which the valve timing is not set at the intermediate lock phase. In this case, when starting the engine the next time, the valve timing must be varied to the intermediate lock phase. Accordingly, the variable valve timing device of the present embodiment includes a ratchet groove 43, which serves as a phase varying portion.

Figure 3B:
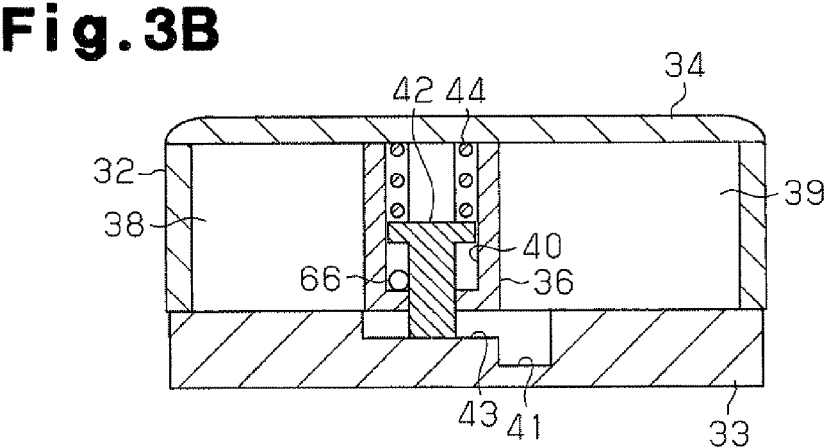

FIG. 3(a) shows a state in which the engine is stopped when the variable valve timing mechanism 30 is at the most retarded phase. When the engine starts, the cranking produces torque alternately acting on the intake camshaft 22 toward the advancing side and the retarding side (hereinafter referred to as "alternating torque"). The alternating torque swings the vane rotor 35 relative to the housing rotor 31 toward the advancing side and the retarding side. Then, the lock pin 42, which is urged from the vane 36 toward the housing rotor 31, enters the ratchet groove 43 as the vane rotor 35 swings toward the advancing side. This state is shown in FIG. 3(b).

Figure 3C:
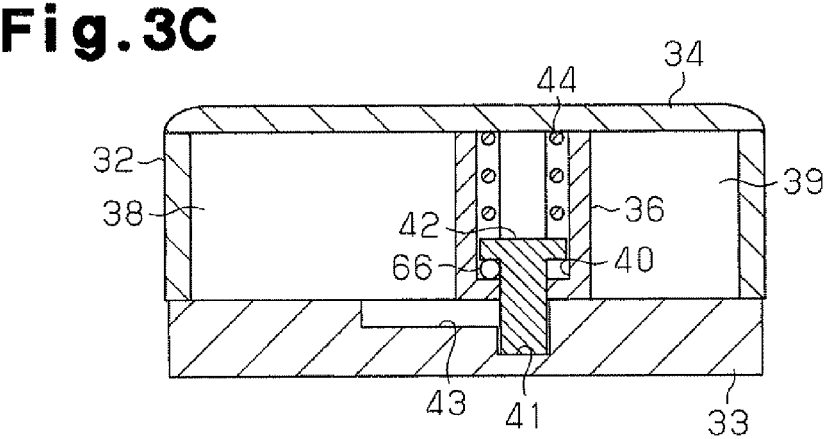

Then, when the alternating torque acts again in this state, the vane rotor 35 further rotates only toward the advancing side due to the restriction of rotation in the retarding direction by the engagement of the ratchet groove 43 and the lock pin 42. Consequently, the lock pin 42 projects into the lock hole 41. This state is shown in FIG. 3(c).

In this manner, in the variable valve timing device 30 of the present embodiment, even when the valve timing is not fixed to the intermediate lock phase when the engine was previously stopped, the valve timing is fixed at the intermediate lock phase when the engine is started the next time.

When the variable valve timing device 30 varies the phase to the intermediate lock phase when the engine is being started as described above, the engine may not be started until the device 30 varies the timing to the intermediate lock phase. For example, since the valve timing is at the retarding side, the air-fuel mixture cannot be sufficiently compressed and ignited. Thus, the engine may not be started. In such a case, the injection of fuel from the injector 17 results in the spark plug 18 becoming wet due to fuel. This deteriorates the ignition performance. As a result, even when the valve timing is varied to a timing corresponding to the intermediate lock phase, the mixture is not ignited and the engine cannot be started. To solve the problem, in the present embodiment, when the engine is started in a state in which the variable valve timing mechanism 30 is not at the intermediate lock phase, the timing at which the injector 17 starts fuel injection is delayed. The procedures for processing this control are shown in FIG. 4.

The present processing is performed when an engine start command is issued. When the present processing starts, the electronic control unit 71 first determines whether or not the relative rotational phase of the variable valve timing mechanism 30 was at the intermediate lock phase during the previous operation of the engine (S110).

It is determined whether or not the relative rotational phase of the variable valve timing mechanism 30 was at the intermediate lock phase during the previous operation and not determined whether or not the relative rotational phase is at the intermediate lock phase in the present operation. This is due to the reasons described below.

The relative rotational phase detection unit, which detects the relative rotational phase, cannot detect the relative rotational phase unless the rotational speeds of the crankshaft 16 and the intake camshaft 22 are greater than or equal to the predetermined values, as described above. When starting the engine, for example, during cranking, the crankshaft 16 and the intake camshaft 22 have low rotational speeds. Thus, the relative rotational phase detection unit may not be able to detect the relative rotational phase. To solve the problem, in the present embodiment, the electronic control unit 71 determines whether or not the relative rotational phase of the variable valve timing mechanism 30 was at the intermediate lock phase during the previous operation.

Specifically, the relative rotational phases of the variable valve timing mechanism 30 continuously detected during the operation of the engine are stored in the electronic control unit 71. Then, the final one of the relative rotational phases stored during the previous engine operation is saved until the next engine operation. In step S110, it is determined whether or not the relative rotational phase is the intermediate lock phase.

When determined in step S110 that the relative rotational phase of the variable valve timing mechanism 30 was not at the intermediate lock phase when the engine was stopped the last time, the electronic control unit 71 resumes that the present relative rotational phase is not at the intermediate lock phase. Thus, to ensure starting of the engine, the phase of the variable valve timing mechanism 30 must be changed to the intermediate lock phase. In this case, even when fuel is injected from the injector when the phase is being varied, the mixture of the fuel and intake air may not be ignited. As a result, the spark plug may become wet due to the fuel, and starting of the engine may be disabled. Accordingly, when the relative rotational phase of the variable valve timing mechanism 30 is varied to the intermediate lock phase, the fuel injection start timing must be delayed from than when the phase is not varied.

In step S120, a coolant temperature THW and an ambient temperature TO, which are respectively detected by the coolant temperature sensor 75 and an ambient temperature sensor 76, are input to the electronic control unit 71. Then, the electronic control unit 71 estimates the present oil temperature T1 of the variable valve timing mechanism 30.

Next, in step S130, based on the oil temperature T1 estimated in step S120, the electronic control unit 71 determines the delay time D1 of the fuel injection start timing. In step S140, the electronic control unit 71 performs a process for delaying the fuel injection start timing based on the delay time D1.

Figure 5:
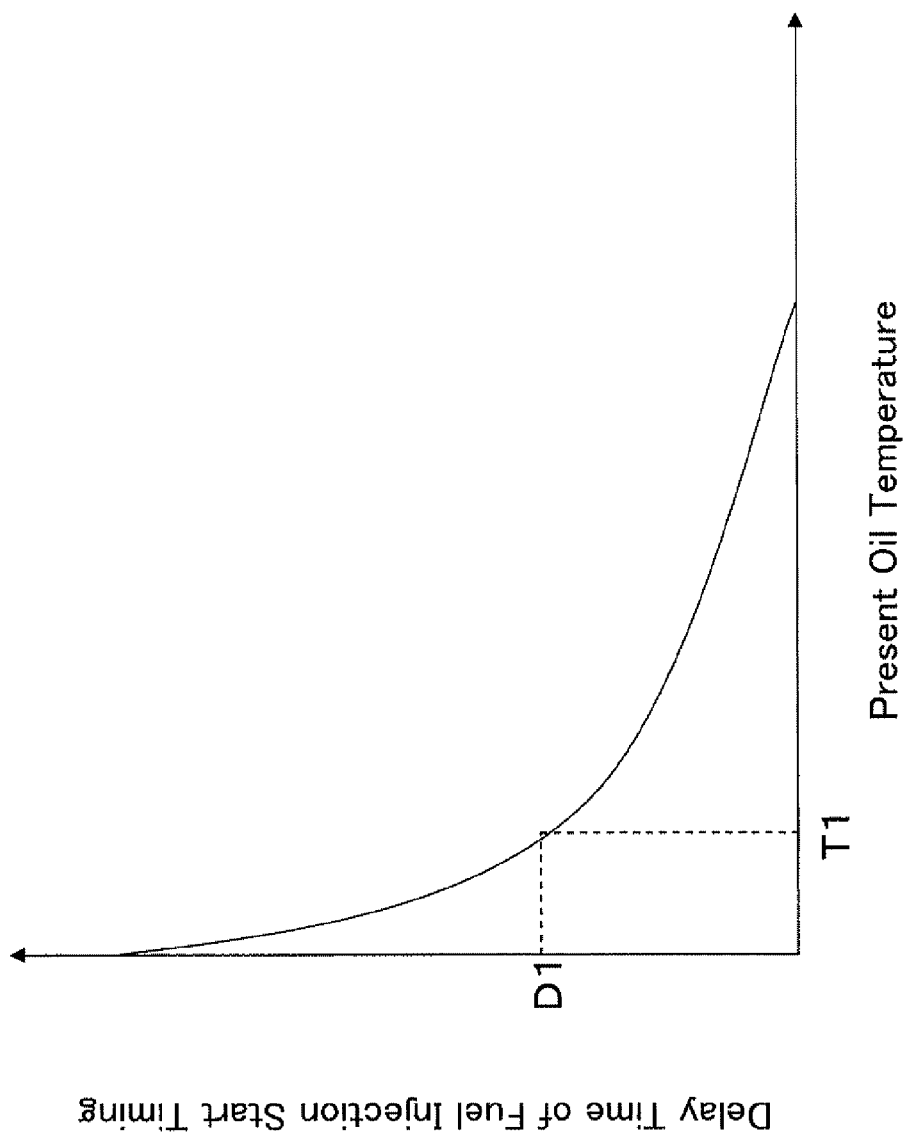
FIG. 5 is a graph showing the relationship between an oil temperature when starting the engine and a delay time of a fuel injection start timing according to the first embodiment.

FIG. 5 shows the relationship between the present oil temperature T1 and the delay time D1 of the fuel injection start timing. As shown in FIG. 5, the delay time D1 of the fuel injection start timing is set to be longer when the oil temperature T1 is lower.

The oil used to operate the variable valve timing mechanism 30 during the previous operation of the engine remains in the mechanism 30. This oil acts as a resistance when the mechanism 30 varies the phase to the intermediate lock phase during the starting of the engine. When the oil temperature is lower, the resistance increases due to the increase in the viscosity of the oil. Thus, a low oil temperature prolongs the time required by the variable valve timing mechanism 30 to vary the phase to the intermediate lock phase.

Accordingly, in the present embodiment, when the oil temperature T1 is low, the fuel injection start timing is delayed from that when the oil temperature T1 is high. This prevents the spark plugs from becoming wet due to the injected fuel and starts the engine as early as possible.

Figure 6:
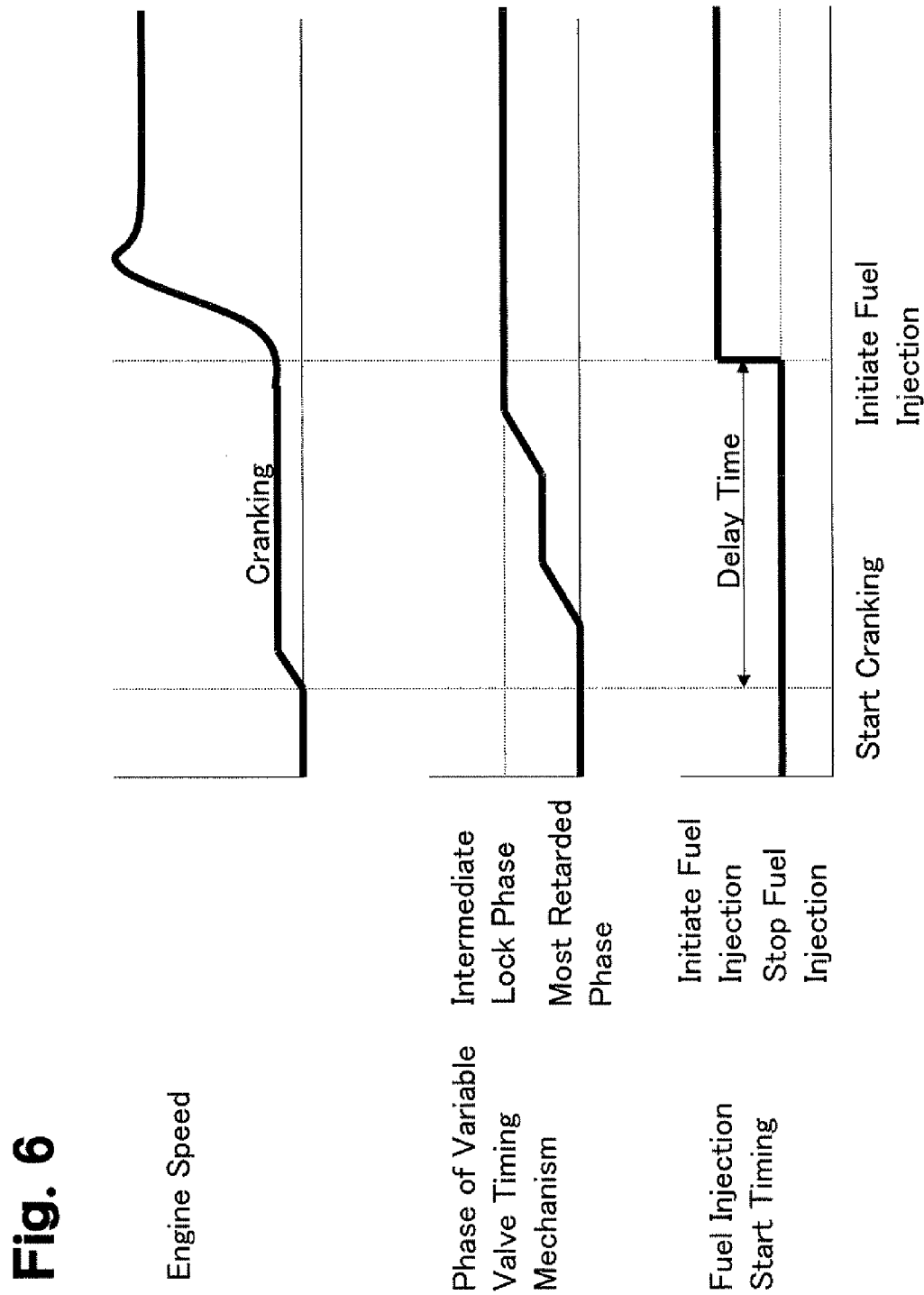
FIG. 6 is a time chart of when starting the engine according to the first embodiment.

FIG. 6 shows a timing chart of the present embodiment. As shown in FIG. 6, cranking starts when starting the engine. When the relative rotational phase of the variable valve timing mechanism 30 is at the maximum delay angle phase when cranking is started, the phase of the mechanism 30 is varied from this phase toward the advancing side and to the intermediate lock phase. The phase varying is performed due to the intake camshaft 22 being swung by alternating torque during cranking and the ratchet groove 43 restricting swinging toward the retarding side during the phase varying. The delay time D1 is estimated from the map shown in FIG. 5. The delay time D1 sets a timing that is as early as possible and later than the time required by the variable valve timing mechanism 30 to advance to the intermediate lock phase. By delaying the fuel injection start timing by the delay time D1, the engine is controlled so that the startability is ensured and the starting is completed as soon as possible.

As described above, the internal combustion engine controller according to the first embodiment has the following advantages.

(1) When it is determined that the relative rotational phase of the variable valve timing mechanism 30 is not at the intermediate lock phase during the starting of the engine, the injector is controlled so that its fuel injection start timing is delayed. This decreases the amount of fuel injected before the relative rotational phase is varied to the intermediate lock phase as compared to when the fuel injection starting timing is not delayed. As a result, the spark plugs do not become wet due to fuel injected before the relative rotational phase varies to the intermediate lock phase. Thus, the ignition capability of the spark plugs is unaffected, and the starting of the engine is ensured.

(2) The relative rotational phase detection unit of the variable valve timing mechanism 30 cannot detect the relative rotational phase of the mechanism 30 unless the rotational speeds of the crankshaft 16 and the intake camshaft 22 are greater than or equal to the predetermined values. Thus, the rotational speeds are low during the starting of the engine, and the relative rotational phase of the variable valve timing mechanism 30 may not be detected during starting of the engine. Accordingly, in the present embodiment, the electronic control unit 71 store the relative rotational phase during the previous operation of the engine and reads the stored relative rotational phase during the present engine starting to determine whether or not the present relative rotational phase is the intermediate lock phase.

(3) The relative rotational phase detection unit in the variable valve timing mechanism 30 cannot detect the relative rotational phase of the mechanism 30 unless the rotational speeds of the crankshaft 16 and the intake camshaft 22 are greater than or equal to the predetermined values. Thus, when the rotational speeds are low during starting of the engine and the relative rotational phase of the variable valve timing mechanism 30 is varied to the intermediate lock phase during the starting of the engine, the electronic control unit 71 may not be able to detect whether or not the relative rotational phase has been varied to the intermediate lock phase. Accordingly, in the present embodiment, the fuel injection start timing is delayed in accordance with the oil temperature. This prevents fuel injection from being started before the phase varying unit varies the relative rotational phase of the variable valve timing mechanism 30 to the intermediate lock phase even when it cannot be determined whether or not the relative rotational phase has been varied to the intermediate lock phase.

(4) When the oil temperature is low, the fuel injection start timing is delayed from that when the oil temperature is high. When the oil temperature is low, the viscosity is generally low as compared to when the temperature is high. As a result, the phase varying unit requires more time for phase varying. Thus, the control described above ensures the startability of the engine, starts fuel injection as soon as early as possible to start the engine.

(5) The oil temperature is estimated from the coolant temperature of the engine and the ambient temperature. This eliminates the need to add a new member to detect the oil temperature, such as an oil temperature sensor, and prevents the number of components from increasing.

Second Embodiment

A second embodiment of the present invention will now be described centering on differences from the first embodiment.

In the first embodiment, the fuel injection start timing is delayed in accordance with the oil temperature during starting. In the present embodiment, the fuel injection start timing is delayed in accordance with the oil temperature and the relative rotational phase of the variable valve timing mechanism 30 during the previous operation of the engine. The differing points are described below.

Figure 7:
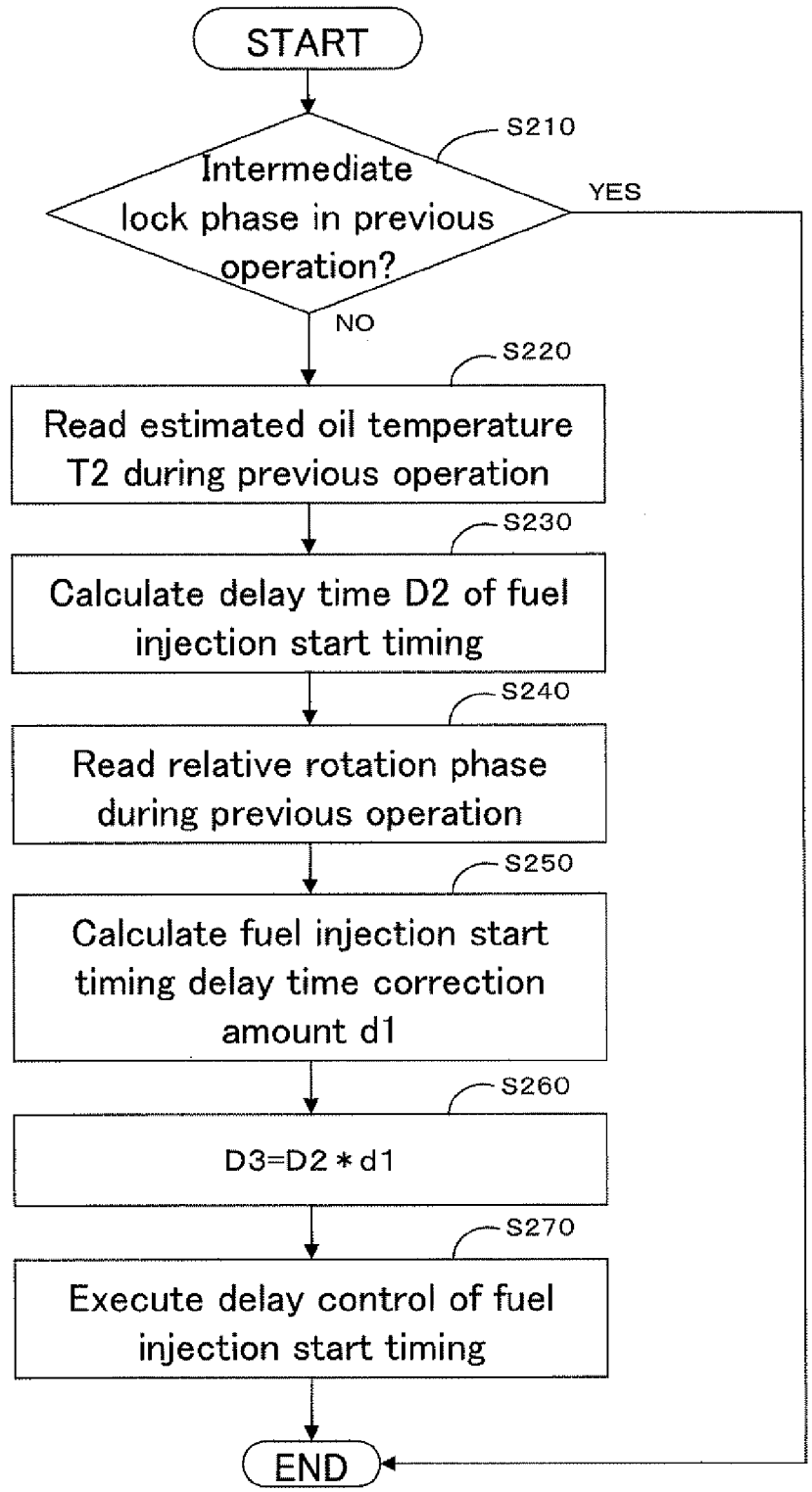
FIG. 7 is a flowchart showing fuel injection start timing control procedures according to a second embodiment.

First, in the first embodiment, as shown in FIG. 4, after estimating the present oil temperature in step S120, the delay time D1 of the fuel injection start timing is determined in step S130. In contrast, in the second embodiment, as shown in FIG. 7, in steps S220 to S260, a delay time D3 is determined from the oil temperature and the relative rotational phase of the variable valve timing mechanism 30 finally detected during the previous operation of the engine.

Figure 8:
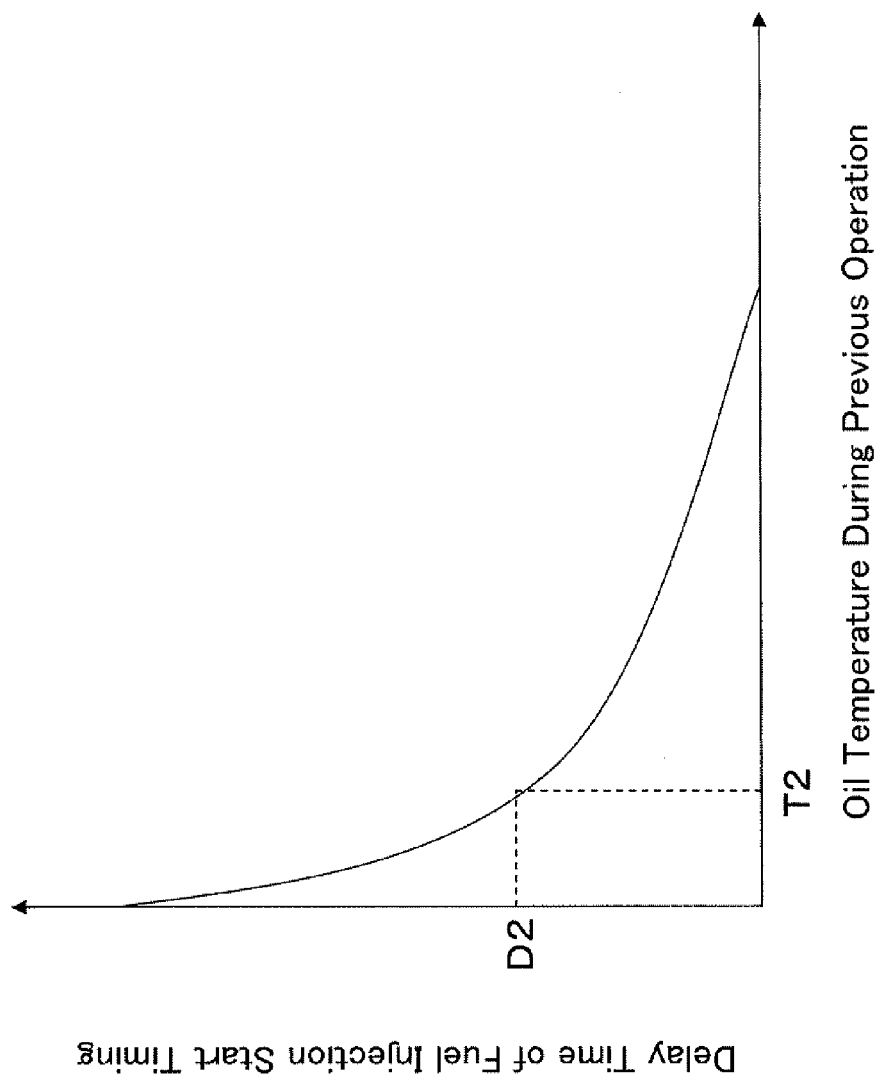
FIG. 8 is a graph showing the relationship between the oil temperature of the engine during the previous operation and a delay time in the fuel injection start timing according to the second embodiment.

In step S220, the electronic control unit 71 reads an oil temperature T2, which was finally detected during the previous operation of the engine. Then, in step S230, the electronic control unit 71 determines a delay time D2 of the fuel injection start timing based on the oil temperature T2. FIG. 8 shows the relationship between the oil temperature T2 during the previous operation of the engine and the delay time D2 of the fuel injection start timing. As shown in FIG. 8, the delay time D2 of the fuel injection start timing is set so as to be longer when the oil temperature T2 is lower.

As described above, the oil remaining in the variable valve timing mechanism 30 acts as a resistance against the varying of the phase by the mechanism 30 to the intermediate lock phase during the starting of the engine. Further, when a large amount of oil is remaining, the resistance increases.

The amount of oil flowing out of the variable valve timing mechanism 30 after the engine stops is correlated with the viscosity of the oil. Further, when the oil temperature is low, the viscosity of the oil becomes high as compared to when the temperature is high.

Accordingly, in the present embodiment, when the oil temperature T2 is low, the fuel injection start timing is delayed as compared to when the temperature is high.

Figure 9:
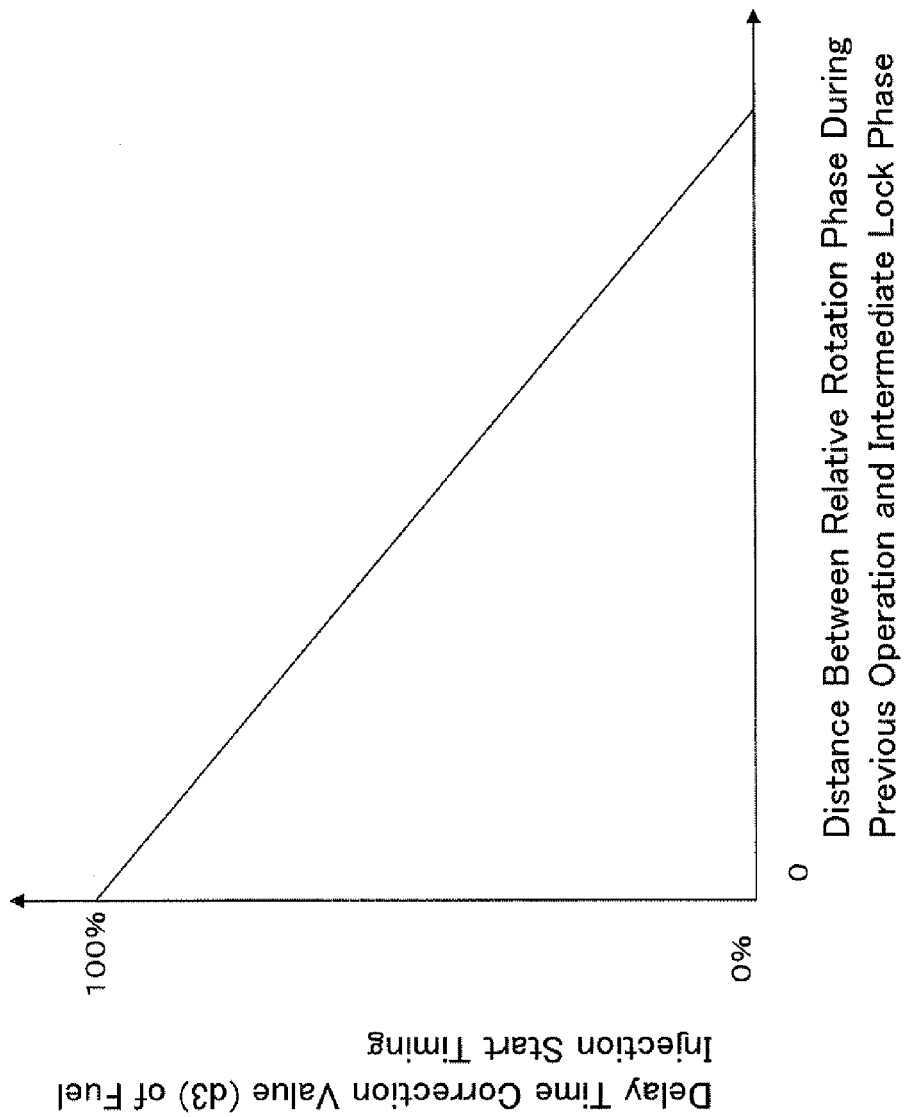
FIG. 9 is a graph showing the relationship between the relative rotational phase of the engine during the previous operation and a correction delay time value of the fuel injection start timing according to the second embodiment.

Further, in the present embodiment, in step S240, the electronic control unit 71 reads the relative rotational phase of the variable valve timing mechanism 30 stored in the electronic control unit 71 when the engine was previously stopped. Subsequently, in step S250, based on the phase, the electronic control unit 71 obtains a correction value d1, which corrects the delay time calculated in step S230. Specifically, the electronic control unit 71 calculates the correction value d1 of the fuel injection start timing delay time D2 from the relative rotational phase of the variable valve timing mechanism 30 finally detected during the previous operation of the engine and read in step S240 and a delay time correction graph shown in FIG. 9. Then, in step S260, the electronic control unit 71 obtains a fuel injection start timing delay time D3 by multiplying this delay time D2 and the correction value d1.

The reasons for correcting the fuel injection start timing delay time D2 in such a manner is as follows. That is, the time required for the phase of the variable valve timing mechanism 30 to be changed to the intermediate lock phase during the starting changes in accordance with the distance between the relative rotational phase of the mechanism 30 and the intermediate lock phase during the starting.

Finally, in step S270, the electronic control unit 71 delays the fuel injection start timing by the delay time D3. Accordingly, the startability of the engine is ensured and the starting of the engine is completed as early as possible.

As described above, the internal combustion engine controller according to the second embodiment has the following advantages.

(6) In the variable valve timing mechanism 30 during engine starting, the oil that was used to operate the mechanism 30 in the previous operation of the engine is remaining. The oil acts as a resistance against the varying of the phase of the mechanism 30 to the intermediate lock phase during engine starting. As the amount of oil increases, the resistance increases. Further, when the oil has high viscosity, the amount of oil flowing out of the variable valve timing mechanism 30 after the engine stops is less compared to when the viscosity is low. Further, the viscosity of the oil is generally correlated with the oil temperature. Accordingly, the startability of the engine is ensured by delaying the fuel injection start timing in accordance with the oil temperature of the previous operation.

(7) When the oil temperature during the previous operation is low, the fuel injection start timing is delayed as compared to when the temperature is high. When the oil temperature is low, the viscosity of the oil is generally low as compared to when the temperature is high. Thus, when the oil temperature during the previous operation is low, the amount of oil that flows out of the variable valve timing mechanism 30 after the engine stops is small as compared to when the oil temperature is high. As a result, more time is required by the phase varying unit to vary the phase when the engine is started the next time. Thus, the above control ensures the startability of the engine and starts fuel injection as early as possible when starting the engine.

(8) When the relative rotational phase of the variable valve timing mechanism 30 during the previous operation of the engine is close to the intermediate lock phase, the delay time of the fuel injection start timing is shorter than when it is far. This completes the starting of the engine at an early timing.

Third Embodiment

A third embodiment of the present invention will now be described centering on differences from the first and second embodiments.

The first and second embodiments delay the fuel injection start timing in accordance with the oil temperature during engine starting that of the previous engine operation. The present embodiment delays the fuel injection start timing in accordance with the coolant temperature THW during starting of the engine.

Figure 10:
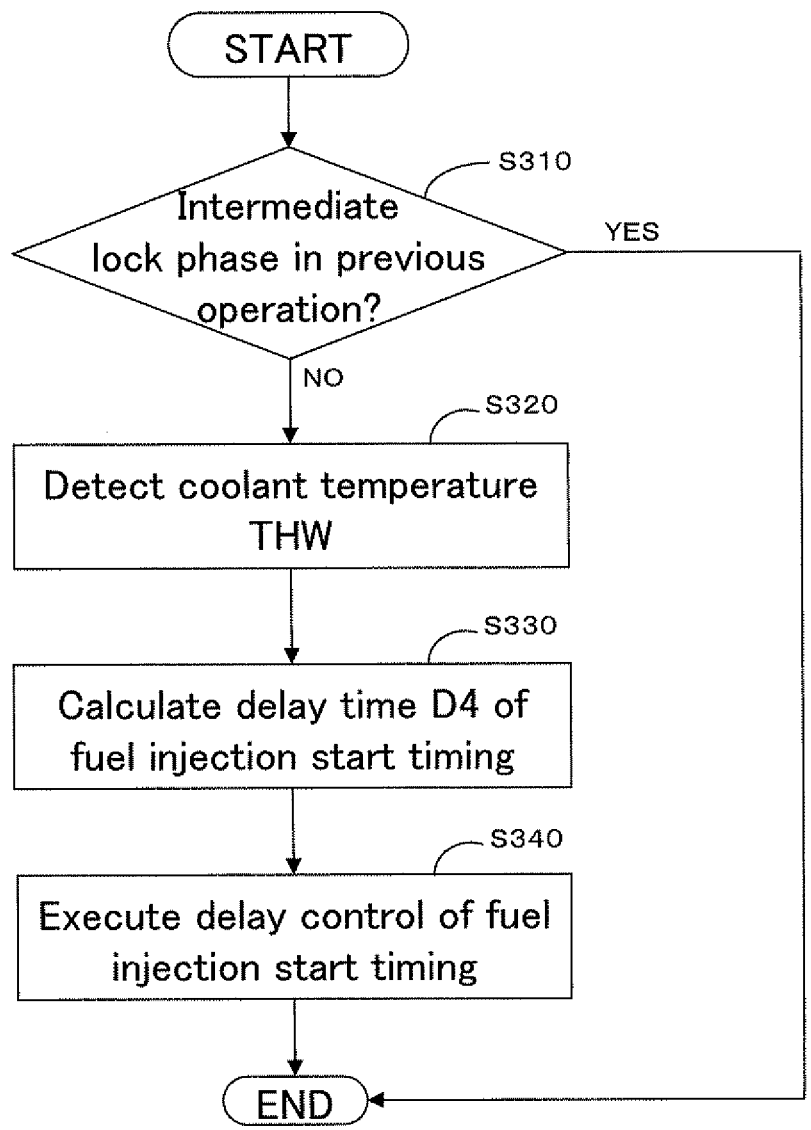
FIG. 10 is a flowchart showing fuel injection start timing control procedures according to a third embodiment.

Specifically, as shown in FIG. 10, in step S320, the electronic control unit 71 detects the coolant temperature THW1. Then, in step S330, the electronic control unit 71 determines a delay time D4.

Figure 11:
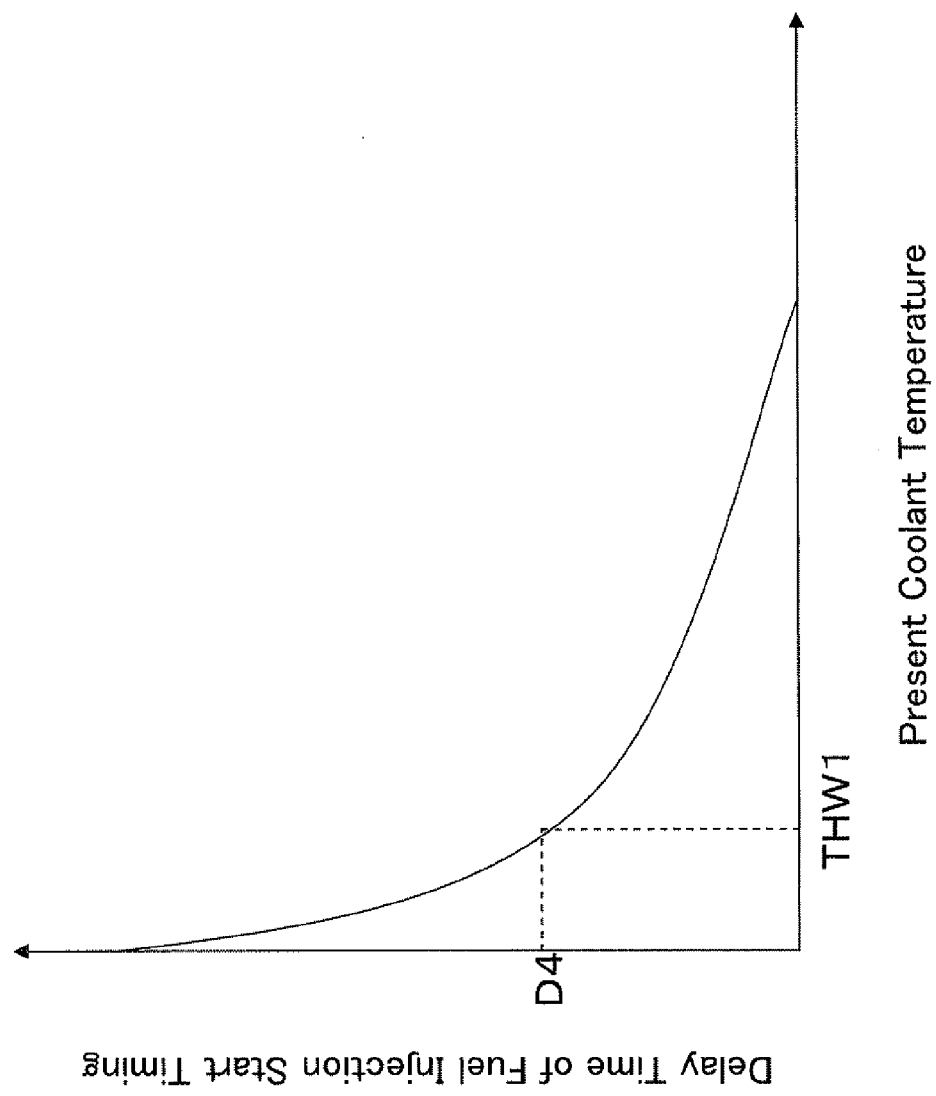
FIG. 11 is a graph showing the relationship between a coolant temperature when starting the engine and a delay time in the fuel injection start timing according to the third embodiment.

FIG. 11 shows the relationship between the coolant temperature during engine starting and the delay time D4 of the fuel injection start timing. As shown in FIG. 11, the delay time D4 is determined so that when the coolant temperature THW is low, the delay time D4 is longer than when the coolant temperature THW is high. This is because it is understood that the present oil temperature is low when the coolant temperature THW is low. Accordingly, the resistance of oil is large when the variable valve timing mechanism 30 varies the relative rotational phase.

Then, in step S340, the electronic control unit 71 controls the delay in the fuel injection start timing based on the delay time D4.

As described above, the internal combustion engine controller according to the third embodiment has the following advantages.

(9) The coolant temperature THW is correlated with the oil temperature. Further, the time required to vary the relative rotational phase of the variable valve timing mechanism 30 changes in accordance with the oil temperature. Thus, by controlling an injector 17 so that the fuel injection start timing is delayed in accordance with the coolant temperature THW, the startability of the engine is ensured and fuel injection is started as early as possible when starting the engine.

(10) When the coolant temperature THW is low, the oil temperature is considered to be higher than when the oil temperature THW is high. Further, when the oil temperature is low, the viscosity of the oil is considered to be higher than when the temperature is high. Thus, when the coolant temperature THW is low, the injector 17 is controlled so that the fuel injection start timing is delayed compared to when the coolant temperature THW is high. This ensures the startability of the engine, and fuel injection is started as early as possible when starting the engine.

The above embodiments may be modified as described below.

In each of the embodiments described above, if the relative rotational phase of the variable valve timing mechanism 30 is not the intermediate lock phase during the starting of the engine, the fuel injection start timing is delayed. However, if it cannot be known whether or not the relative rotational phase by the variable valve timing mechanism 30 is an intermediate lock phase during starting of the engine, the fuel injection start timing may be delayed irrespective of this phase during the starting of the engine. For example, when the engine is started to start cranking, fuel injection may be started after a predetermined lapse of time elapses instead of starting it immediately. This predetermined lapse of time may be changed on the basis of parameters such as an oil temperature, a coolant temperature, and a relative rotational phase by the variable valve timing mechanism 30 during the previous operation of the engine. In such a case also, the problems in the present invention can be solved.

In each of the embodiments described above, the fuel injection start timing has been changed depending on the oil temperature and the coolant temperature during the present or previous operation of the engine. However, if it is difficult to detect or estimate the oil temperature, the fuel injection start timing may be delayed irrespective of the oil temperature. In this case also, advantages (1) and (2) can be obtained.

In each of the first and second embodiments described above, if the oil temperature is low, the fuel injection start timing has been delayed as compared to a case where the temperature is high. However, in a case where if the oil temperature is low, phase varying does not take a long time as compared to a case where the temperature is high, and the timing need not be delayed as in the above case. In this case also, the oil temperature can be used as one of the parameters with which to estimate the time required for phase varying, advantages (1) to (3), (5) and (6), and (8) can be obtained.

In the third embodiment described above, if the coolant temperature THW is low, the fuel injection start timing has been delayed as compared to a case where the temperature is high. However, in a case where if the coolant temperature THW is low, phase varying does not take a long time as compared to when the temperature is high, and the timing need not be delayed as described above. In this case also, the coolant temperature can be used as one of the parameters with which to estimate the time required for phase varying, advantages (1) and (2) and (9) can be obtained.

Although in the first and second embodiments, the oil temperature for the engine has been estimated on the basis of the correlated parameters, a device such as an oil temperature sensor may be used to detect the oil temperature directly.

Figure 12:
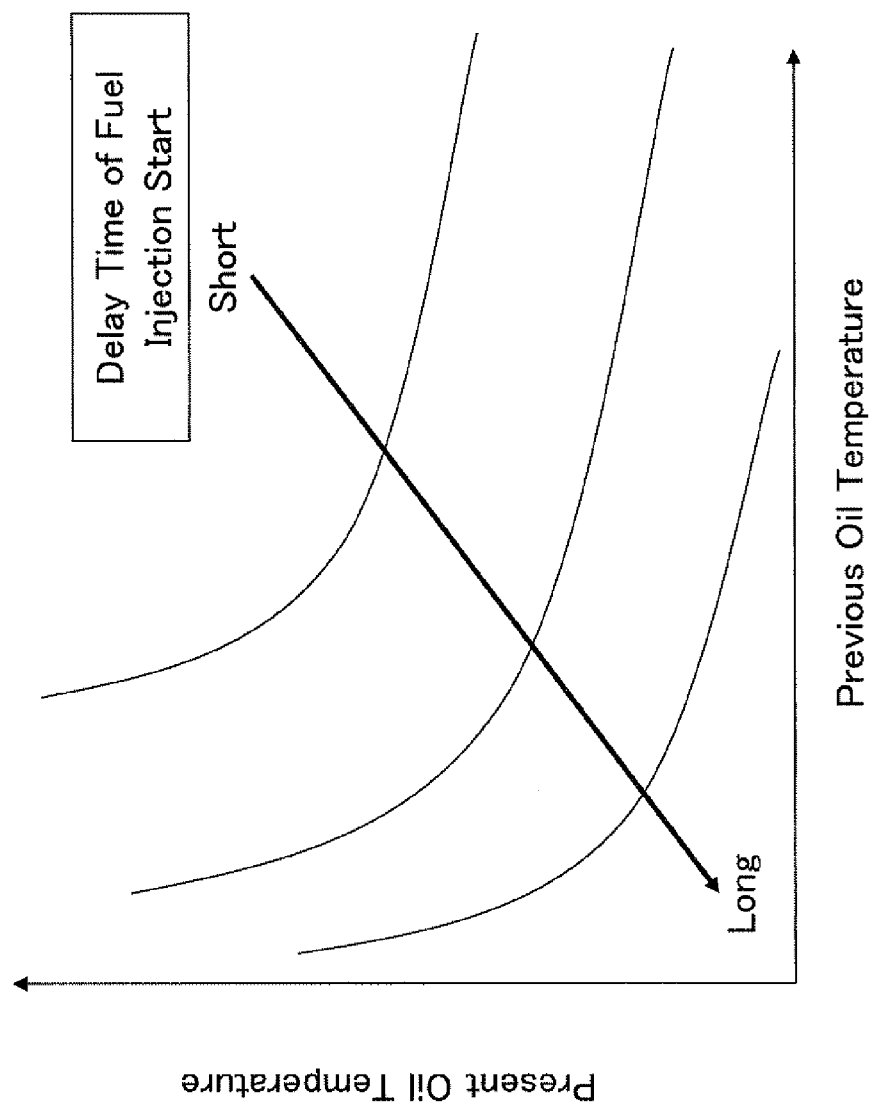
FIG. 12 is a map showing the relationship of the delay time in the fuel injection start timing, the oil temperature when starting the engine, and the oil temperature of the engine during the previous operation.

Although in the first embodiment, a delay time in the fuel injection start timing has been calculated from the oil temperature during the starting of the engine, additionally, an oil temperature during the previous operation of the engine or a relative rotational phase by the variable valve timing mechanism 30 may be taken into account. For example, in the case of taking into account also the oil temperature during the previous operation of the engine, the delay time is calculated on the basis of a map such as shown in FIG. 12. By performing such calculation, it is possible to complete starting of the engine as early as possible while securing the starting performance of the engine.

Although in the second embodiment, the fuel injection start timing has been delayed on the basis of an oil temperature during the previous operation of the engine and the present relative rotational phase by the variable valve timing mechanism 30. However, in a case where the present relative rotational phase by the variable valve timing mechanism 30 cannot be estimated, the delay time in the fuel injection start timing may be obtained only based on an oil temperature at the time of the previous stopping.

Although in each of the embodiments, if the relative rotational phase by the variable valve timing mechanism 30 during the previous operation of the engine is not an intermediate lock phase, it has been determined that the relative rotational phase by this mechanism 30 during the present starting is not the intermediate lock phase. However, even if the relative rotational phase by this mechanism 30 during the present starting is not the intermediate lock phase, there is a case where such a possibility is high that the relative rotational phase has been changed to the intermediate lock phase by the present starting of the engine. For example, this holds true with a case where along with the flowing out of the oil after the completion of the previous stopping of the engine, the relative rotational phase autonomously changes to the intermediate lock phase as above. Accordingly, if the relative rotational phase by this mechanism 30 during the previous operation is such a phase, the relative rotational phase by this mechanism 30 may be considered to be the intermediate lock phase during the present starting of the engine.

In each of the above embodiments, if the relative rotational phase by the variable valve timing mechanism 30 during the previous operation of the engine might not be an intermediate lock phase, it has been determined that the relative rotational phase by this mechanism 30 during the present starting is not an intermediate lock phase. However, in a case where it is difficult to store the relative rotational phase by the variable valve timing mechanism 30 during the previous operation of the engine, only whether or not the relative rotational phase by this mechanism 30 during the previous operation of the engine was locked to the intermediate lock phase during the previous operation of the engine may be stored.

It is to be noted that whether or not it is locked to the intermediate lock phase is determined as follows, for example. That is, if an intermediate lock request is output, the oil is controlled so that a lock pin 42 may project. Then, a target value of the relative rotational phase by the variable valve timing mechanism 30 is set to such a phase as to be distant more than an intermediate lock phase as viewed from the present phase. As a result, if the phase after a predetermined lapse of time elapses since alteration of the relative rotational phase is started is the intermediate lock phase, it is determined that the variable valve timing mechanism 30 is locked to the intermediate lock phase. On the other hand, if the relative rotational phase is its target value, it means that the lock pin 42 is not locked in a lock hole 41 and a vane rotor 35 has passed through the intermediate lock phase, so that it is determined that the variable valve timing mechanism 30 is not locked to the intermediate lock phase.

Further, if it is determined through this determination that the intermediate lock phase is not locked, an intermediate lock flag 1 is stored in the electronic control unit 71 and, otherwise, an intermediate lock flag 0 is stored in the electronic control unit 71. The electronic control unit 71 stores this flag also after the engine is stopped.

Then, by reading this flag during the starting of the engine, it is determined whether or not the variable valve timing mechanism 30 is locked to the intermediate lock phase during the previous operation of the engine. If the relative rotational phase is not locked to the intermediate lock phase, there is a possibility that the relative rotational phase by this mechanism 30 is not the intermediate lock phase, so that the injector 17 may be controlled so that the fuel injection start timing may be delayed.

In each of the first and second embodiments, the time required by the relative rotational phase by the variable valve timing mechanism 30 to be changed to the intermediate lock phase has been estimated from the oil temperature etc., to delay the fuel injection start timing by at least this time. However, even in a case where this relative rotational phase is changed to the intermediate lock phase, if fuel is injected to start combustion in a state where the lock pin 42 is not locked in the lock hole 41 and, therefore, the mechanism 30 is not locked, this mechanism 30 severely flip-flops and so may possibly be damaged. To solve the problem, the time required by the lock pin 42 to be inserted into the lock hole 41 may be estimated so that the fuel injection start timing would be delayed at least by the length of this time.

Although in each of the above embodiments, the intermediate lock mechanism has been controlled by an OCV, it may be controlled by a hydraulic control mechanism, such as an oil switching valve which is mounted separately.

Although in each of the above embodiments, some components in the variable valve timing mechanism 30 have been coupled to an intake camshaft 22, they may be coupled to an exhaust camshaft 24. Further, a variable valve timing mechanism coupled to the intake camshaft 22 and that coupled to the exhaust camshaft 24 may each be provided.

Although in each of the above embodiments, a crankshaft 16 and a housing rotor 31 have been coupled so that they might rotate in synchronization with each other and the intake camshaft 22 and the vane rotor 35 have been coupled so that they might rotate in synchronization with each other, the coupling combinations are not limited to them. Further, the above description has been given only as one example of the valve timing mechanism, so that of course it does not exclude a structure in which any other mechanism may make the valve timing variable.

DESCRIPTION OF REFERENCE NUMERALS 1 internal combustion engine
10 engine body
11 cylinder block
12 oil pan
13 cylinder head
14 combustion chamber
15 piston
16 crankshaft
17 injector
18 spark plug
21 intake valve
22 intake camshaft
23 exhaust valve
24 exhaust camshaft
30 variable valve timing mechanism
31 housing rotor
31A partition wall
32 housing body
33 sprocket
34 cover
35 vane rotor
36 vane
37 vane accommodation chamber
38 advancing chamber
39 retarding chamber
40 lock pin accommodation chamber
41 lock hole
42 lock pin
43 ratchet groove
44 biasing spring
45 bolt
50 hydraulic mechanism
51 oil pump
52 oil control valve
60 oil passage
61 oil intake passage
62 oil supply passage
63 oil discharge passage
64 advancing oil passage
65 retarding oil passage
66 pin oil passage
71 electronic control unit
72 crank position sensor
73 cam position sensor
74 intake air temperature sensor
75 coolant temperature sensor
76 ambient temperature sensor

The invention claimed is:

1. A controller for an internal combustion engine, the internal combustion engine comprising:
a fuel injection device that injects fuel into the internal combustion engine;
a crankshaft;
a camshaft that opens and closes an engine valve of the internal combustion engine; and
a variable valve timing device that varies valve timing of the engine valve, wherein the variable valve timing device includes:
a variable valve timing mechanism including a first rotational body, which is drive-coupled to the crankshaft, and a second rotational body, which is drive-coupled to the camshaft, wherein the variable valve timing mechanism varies a relative rotational phase of the first rotational body and the second rotational body by controlling hydraulic pressure to vary the valve timing; and
an intermediate lock mechanism that fixes the relative rotational phase to an intermediate lock phase, which is a phase in a variable range of the relative rotational phase excluding both ends of the variable range;
wherein when the starting of the internal combustion engine is initiated in a state in which the relative rotational phase is not at the intermediate lock phase, a delay time from when the starting is initiated to when the fuel injection starts is set so that a fuel injection start timing of the fuel injection device is delayed as compared to when the starting of the internal combustion engine is initiated in a state in which the relative rotational phase is at the intermediate lock phase.

2. The controller according to claim 1, wherein based on the relative rotational phase during a previous operation of the internal combustion engine, the controller determines whether or not the relative rotational phase is not at the intermediate lock phase when initiating the present starting of the internal combustion engine.

3. The controller according to claim 1, wherein the controller sets the delay time in accordance with oil temperature of the variable valve timing device during the starting of the internal combustion engine.

4. The controller according to claim 1, wherein the controller prolongs the delay time when oil temperature of the variable valve timing device during the starting of the internal combustion engine is low as compared to when the oil temperature is high.

5. The controller according to claim 1, wherein the controller sets the delay time in accordance with oil temperature of the variable valve timing device during a previous operation of the internal combustion engine.

6. The controller according to claim 1, wherein the controller prolongs the delay time when oil temperature of the variable valve timing device during a previous operation of the internal combustion engine is low as compared to when the oil temperature is high.

7. The controller according to claim 2, wherein the oil temperature is estimated based on a parameter correlated with the oil temperature.

8. The controller according to claim 1, the controller sets the delay time in accordance with coolant temperature of the internal combustion engine.

9. The controller according to claim 1, wherein the controller prolongs the delay time when coolant temperature of the internal combustion engine is low as compared to when the coolant temperature is high.

10. The controller according to claim 1, wherein the controller prolongs the delay time when the relative rotational phase during a previous operation of the internal combustion engine is far from the intermediate lock phase as compared to when the relative rotational phase is close to the intermediate lock phase.

11. The controller according to claim 1, wherein the intermediate lock phase allows the engine to start, and
   wherein the variable valve timing device further includes:
      a relative rotational phase detection unit that detects the relative rotational phase, wherein the relative rotational phase detection unit includes a cam angle sensor, which is capable of detecting a rotational angle of the camshaft when a rotational speed of the camshaft is greater than or equal to a predetermined value, and a crank angle sensor, which is capable of detecting a rotational angle of the crankshaft when a rotational speed of the crankshaft is greater than or equal to a predetermined value, and the relative rotational phase detection unit calculates the relative rotational phase based on the rotational angle of the camshaft detected by the cam angle sensor and the rotational angle of the crankshaft detected by the crank angle sensor; and
      a phase varying unit that varies the relative rotational phase to the intermediate lock phase when starting of the internal combustion engine is initiated in a state in which the relative rotational phase is not at the intermediate lock phase.

12. A controller for an internal combustion engine, the internal combustion engine comprising:
   a fuel injection device that injects fuel into the internal combustion engine;
   a crankshaft;
   a camshaft that opens and closes an engine valve of the internal combustion engine; and
   a variable valve timing device that varies valve timing of the engine valve, wherein the variable valve timing device includes:
   a variable valve timing mechanism including a first rotational body, which is drive-coupled to the crankshaft, and a second rotational body, which is drive-coupled to the camshaft, wherein the variable valve timing mechanism varies a relative rotational phase of the first rotational body and the second rotational body by controlling hydraulic pressure to vary the valve timing; and
   an intermediate lock mechanism that fixes the relative rotational phase to an intermediate lock phase, which is a phase in a variable range of the relative rotational phase excluding both ends of the variable range;
   wherein when the starting of the internal combustion engine is initiated in a state in which the relative rotational phase is not at the intermediate lock phase, the controller is adapted to change the relative rotational phase to the intermediate lock phase during the initiation of the internal combustion engine, estimate a time period required for the relative rotational phase to change from the state in which the relative rotational phase in not at the intermediate lock phase to a state in which the relative rotational phase is at the intermediate lock phase, and allow for the injection device to inject fuel after the time period has elapsed from the initiation of starting of the internal combustion engine.

* * * * *